United States Patent [19]

Yasumatsu et al.

[11] 4,130,254
[45] Dec. 19, 1978

[54] SEAT BELT WINDING DEVICE

[75] Inventors: Jun Yasumatsu, Toyota; Noriyuki Masuda, Joetsu; Tatsushi Kubota, Okazaki, all of Japan

[73] Assignees: Toyota Jidosha Kogyo Kabushiki Kaisha; Tokai Rika Denki Seisakusho, both of Japan

[21] Appl. No.: 818,300

[22] Filed: Jul. 25, 1977

[30] Foreign Application Priority Data

Aug. 6, 1976 [JP] Japan .............................. 51-105011[U]

[51] Int. Cl.$^2$ ........................ A62B 35/02; B65H 75/48
[52] U.S. Cl. ............................ 242/107.1; 242/107.4 R; 280/747
[58] Field of Search .............................. 242/107–107.7; 280/744–747; 297/388

[56] References Cited

U.S. PATENT DOCUMENTS

| 749,971 | 1/1904 | Nordhoff | 242/107.3 |
| 3,549,203 | 12/1970 | Rawson | 242/107.4 D X |

Primary Examiner—Harvey C. Hornsby
Assistant Examiner—John M. Jillions
Attorney, Agent, or Firm—Koda and Androlia

[57] ABSTRACT

A seat belt winding device for motor vehicles of the type for winding up two seat belts upon a single winding device shaft one over the other including a shaft for winding the two seat belts upon, means for causing the shaft to rotate in the windup direction when the two seat belts are extended and a pressure board resiliently engaging with the outside surface of the seat belts wound on the shaft whereby a pressure is always applied to the two seat belts when they are extended.

10 Claims, 4 Drawing Figures

SEAT BELT WINDING DEVICE

BACKGROUND OF THE INVENTION

1. Field of Invention

This invention relates to seat belt winding devices and more particularly to seat belt winding devices in which two seat belts are wound up on a single winding device shaft one over the other.

2. Prior Art

In conventional seat belt winding devices for protecting passengers during a collision of a motor vehicle, the three-point type seat belt which consists of a lap belt and a shoulder belt have been widely used. In these three-point type seat belt systems, when the passenger is not using the belt or only a part thereof is being used, the unused portions are wound up by means of spring-loaded winding devices, thereby improving the fitness characteristics and housing of the seat belts.

In the prior art three-point seat belt systems, it has been accepted that two separate winding devices must be installed, one for the lap seat belt and one for the shoulder seat belt to insure the best fitness characteristics and to house the belts. However, it has been proposed that a single winding device could wind both seat belts up without impairing the fitness characterisitics and housing.

Referring to FIGS. 1 and 2, shown therein is a seat belt device for winding up two seat belts on a single winding device shaft one over the other. In FIGS. 1 and 2, the seat belt winding device includes a lap seat belt 10A and a shoulder seat belt 10B. Lap seat belt 10A and shoulder seat belt 10B are formed in a single belt and extend through a hole 12 in tongue plate 11. This device is designed for winding up both the lap seat belt 10A and the shoulder seat belt 10B which extends through a slit in an anchor 14 which is fixed to the upper side wall of a motor vehicle 13 above the seat belt winding device 15. The winding device 15 is fixed to the lower part of the sidewall of the vehicle 13 and is arranged and configured such that a lap seat belt 10A and shoulder seat belt 10B are both wound upon a single spring-loaded shaft 16. Accordingly, by using a two belts winding type seat belt device 15, when either one of the seat belts is extended out of the winding device 15, the other seat belt is also extended out of the device 15 at the same time. Moreover, the lap seat belt 10A and the shoulder seat belt 10B are always kept at an appropriate length since the two belts can be moved one way or the other. Therefore, this two belts winding device 15 has many desirable characteristics even though it is a simplified device.

Even though this two belts winding type seat belt 15 has many desirable characteristics, it has one weak point. The weak point is the tension applied to the seat belt during extension and retraction. If the tension applied is very weak, the two seat belts are not wound very tightly onto the shaft 16 and therefore the two belts are not wound up on the shaft of equal length. Accordingly, whenever the belts are then pulled out of the winding up device 15, some slack may occur within the seat belt winding device 15 as shown by the dotted lines in FIG. 2. This slack causes not only harmful effects to the efficiency of operation of the seat belt but also interferes with the working of the emergency locking retractor mechanism which stops the winding out of the seat belt automatically during an emergency.

Accordingly, it is an object of the present invention to overcome the difficulties of the prior art.

SUMMARY OF THE INVENTION

Accordingly, it is a general object of the present invention to provide a two belts winding type seat belt device which prevents slack from occurring in the seat belt during its operation.

It is another object of the present invention to provide a two belts winding type seat belt device which insures that the two belts are tightly wound around the winding device shaft.

It is yet another object of the present invention to provide a two belts winding type seat belt device which insures that the same length of belt for each of the two belts is wound up on the shaft of the winding device.

In keeping with the principles of the present invention, the objects are accomplished by a unique seat belt winding device for motor vehicles of the type which winds up two seat belts upon a single seat belt winding device including a shaft for winding the two seat belts upon, means for causing the shaft to wind up when the seat belts are extended and a pressure board resiliently engaging with the outside surface of the seat belts wound on the shaft whereby pressure is always applied to the two seat belts when they are extended or retracted, thereby insuring that the two seat belts are wound tightly on the shaft and are of the same length.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DESCRIPTION OF THE INVENTION

Figure 1:
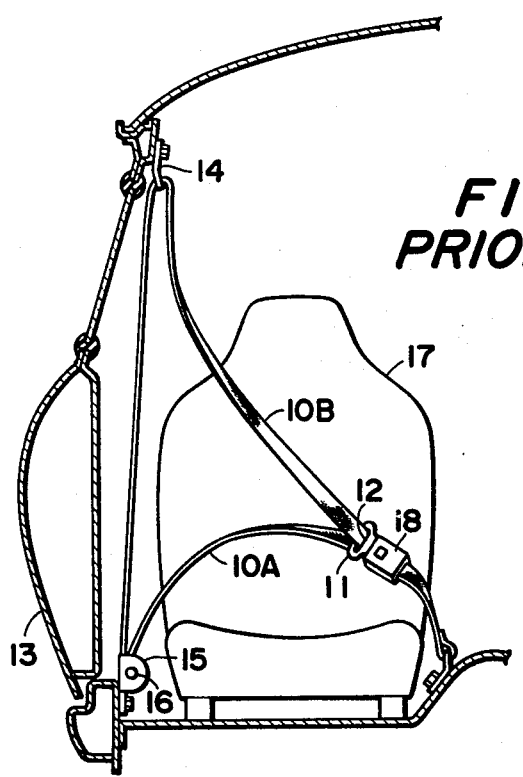
FIG. 1 illustrates a conventional seat belt device.
Figure 2:
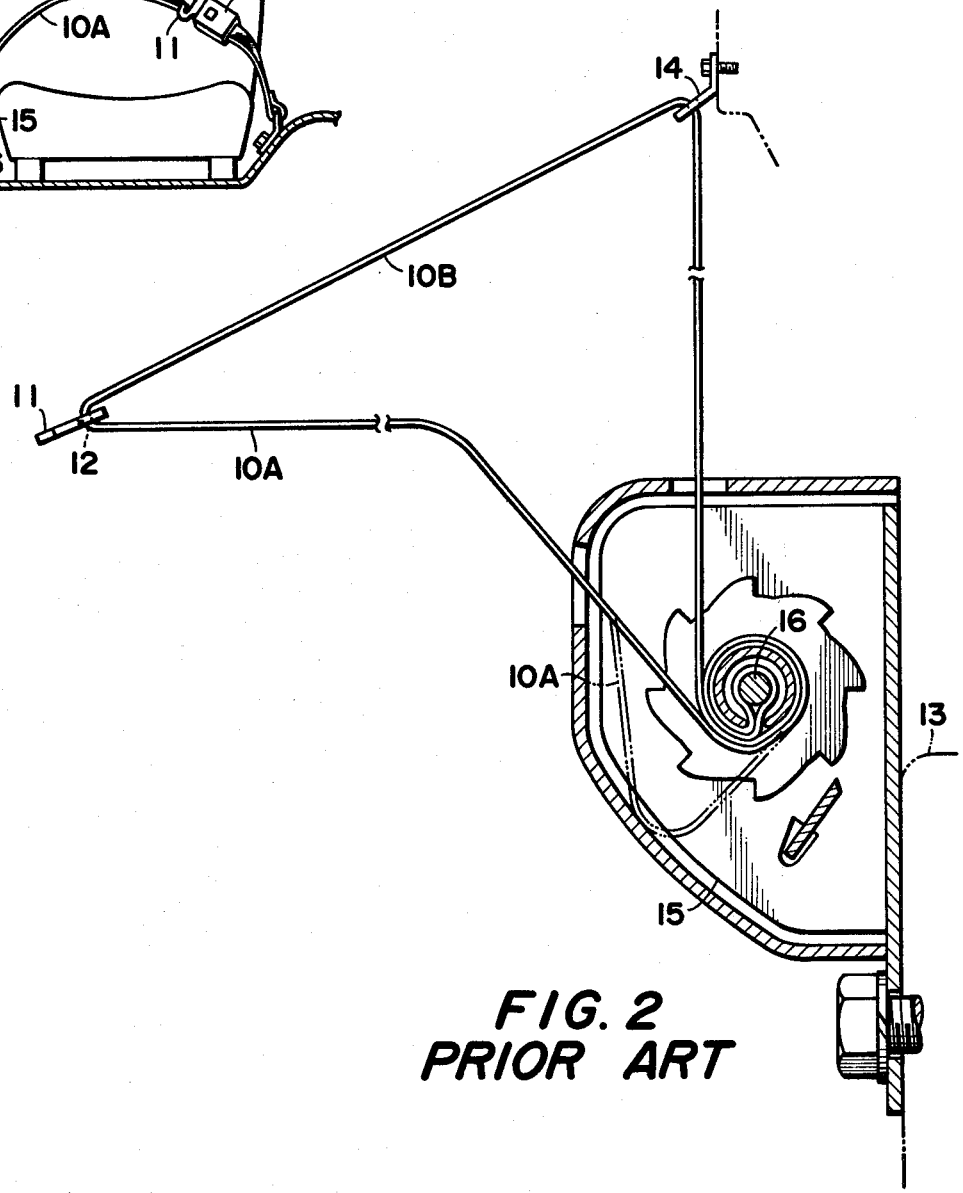
FIG. 2 is a cross-sectional view of a conventional seat belt winding device.
Figure 3:
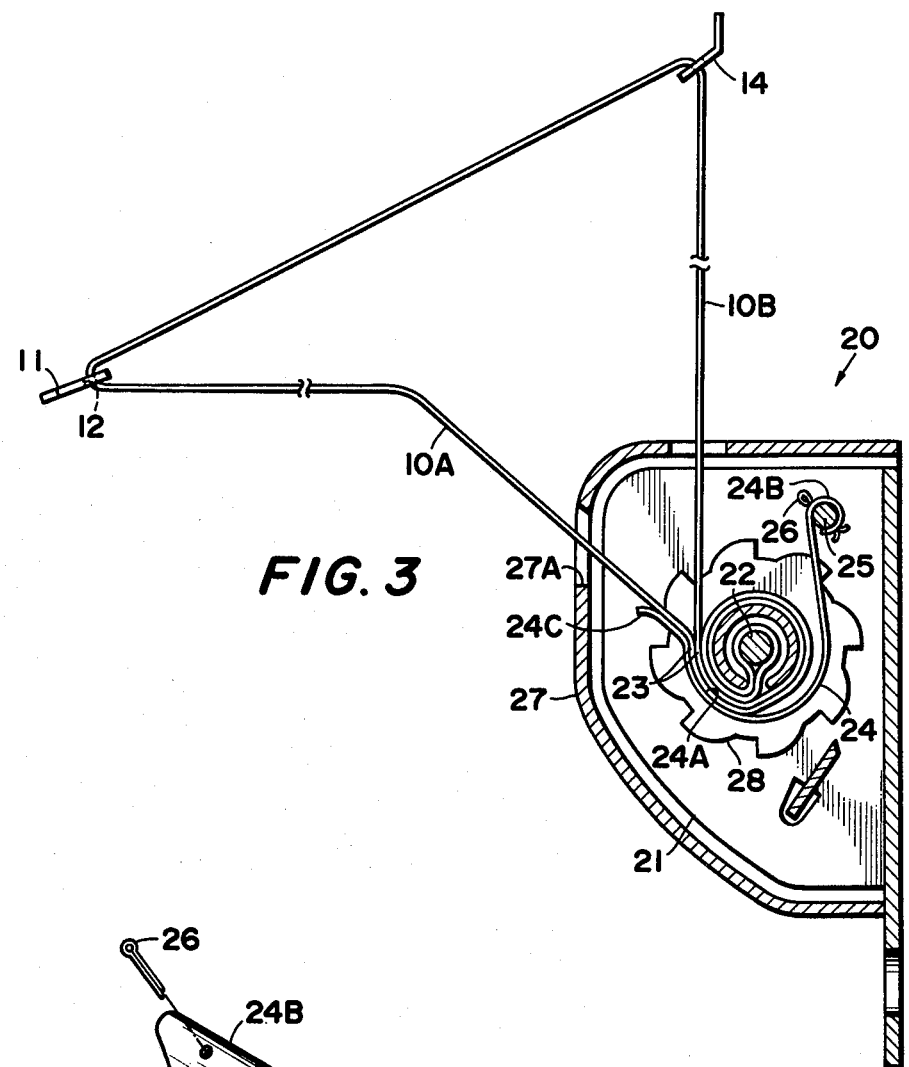
FIG. 3 is a cross-sectional view of a seat belt winding device in accordance with the teachings of the present invention.
Figure 4:
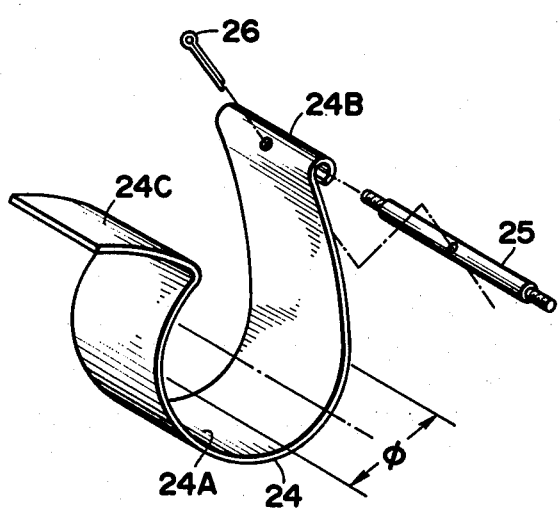
FIG. 4 is a perspective view of a pressure board utilized in a seat belt winding device in accordance with the teachings of the present invention.

Referring more particularly to the drawings, shown in FIG. 3 is a seat belt winding device in accordance with the teachings of the present invention. The seat belt winding device 20 of FIG. 3 includes a lap seat belt 10A and a shoulder seat belt 10B wound up on a shaft 22 one over the other which is rotatably coupled to a base 21 in a manner substantially the same as conventional seat belt winding devices. Lap seat belt 10A and shoulder seat belt 10B are both coupled at one end to shaft 22 and form a continuous loop which extends from the shaft 22 through a slit in an anchor 14 through a hole 12 in tongue plate 11 and back to shaft 22. The two seat belts 10A and 10B are both wound up on the shaft 22 one over the other and are directed to move in and another towards his shoulder, when a passenger fastens the seat belt. A pressure board 24 is provided within the seat belt winding device 20. The pressure board 24 is formed in the shape of a letter J and one end 24B is finished in a ring. Pressure board 24 is fixed to the base 21 by a shaft 25 extending through the ring portion 24B and a cotter pin 26 extending through end 24B and shaft 25. The middle part of pressure board 24 is bent in accordance with a fixed curvature and curves about the shaft 22. The inner surface 24A of the pressure board 24 engages with the outer surface 23 of the wound up seat belts and applies a pressure to the seat belts along the axis of the shaft 22. Also, end 24C is formed at approximately a right angle to the middle part of pressure board 24 and provides guidance for the lap seat belt 10A by extending toward the lap seat belt opening 27A which is provided in cover 27 which conceals base 21.

The pressure board 24 is arranged and configured so that it will always maintain a pressure on the outside surface 23 of the wound up seat belts and will also exert a pressure against the shaft 22 when all of the seat belt is pulled out of the winding device 20. Moreover, it is desirable that the pressure board 24 be designed such that it is not interfered with by the base or the ratchet plate 28 for the emergency locking retractor mechanism by making the width of the pressure board 24 narrower than the width of the seat belts 10A and 10B.

In practice, the pressure board 24 may be made from an elastic material such as a spring material or a resin. However, the pressure board 24 may be made from a rigid material. When a rigid material is used for pressure board 24 it is necessary to utilize a separate elastic body to apply a pressure on the outer surface 23 of the wound up belts and the axis of the shaft 22. For example, the pressure board 24 is made of a rigid material and a spring is disposed between the end 24B of the pressure board 24 and the supporting shaft 25 so that the pressure board 24 is biased to resiliently engaging with the outside surface of said seat belts.

In operation, the pressure board 24 always applies a pressure on the outer surface 23 of the wound up seat belts 10A and 10B. Therefore, even if a passenger operates the seat belt winding device such that no pressure is applied to either one of the seat belts 10A or the shoulder seat belt 10B when he fastens the seat belt, both seat belts 10A and 10B are wound out from the shaft 22 the same length. Therefore, the seat belts 10A and 10B can be extended and retracted without affecting the efficiency of operation or binding as a result of slack inside of the seat belt winding device.

It should be apparent to one skilled in the art that the pressure board 24 can be mounted in the seat belt retractor device 20 in a number of manners without departing from the spirit and scope of the invention. Furthermore, in all cases it is understood that the above described embodiment is merely illustrative of but one of the many possible specific embodiments which can represent the applications of the principles of the present invention. Numerous and varied other arrangements can be readily devised in accordance with these principles by those skilled in the art without departing from the spirit and scope of the invention.

We claim:

1. A seatbelt winding device for motor vehicles comprising:
   a pair of seatbelts;
   a base;
   a shaft rotatably supported by said base for winding up said pair of seatbelts; and
   a pressure board coupled to said base and resiliently engaging with and substantially surrounding the outside surface of said seatbelts wound up on said shaft for preventing slack in said seatbelts, whereby a pressure is applied to said seatbelts along said shaft and both of said seatbelts will extend together the same length when unwound.

2. A seat belt winding device according to claim 1, further comprising:
   a support shaft fixed to said base for supporting said pressure board; and
   a resilient means disposed between said support shaft and said pressure board whereby said pressure board is biased to resiliently engage with the outside surface of one of said seat belts.

3. A seat belt winding device according to claim 1 wherein said pair of seat belts are formed in a continuous seat belt.

4. A seat belt winding device according to claim 1 wherein said pressure board is made from a resilient material.

5. A seatbelt winding device according to claim 4 wherein said pressure board is in the shape of a J which substantially surrounds the outside surface of said seatbelts.

6. A seatbelt winding device according to claim 5 further comprising a retractor case, an opening in the case, and wherein the end portion of said pressure board in the shape of the letter J is formed in an approximate right angle to the remainder of the letter J shaped pressure board for guiding one of said seatbelts towards said opening of said retractor case.

7. A seat belt winding device according to claim 5 wherein the end of the J guides one of said seat belts.

8. A seat belt winding device according to claim 7 further comprising a housing enclosing said belts, shaft, base and pressure board.

9. A seatbelt winding device according to claim 5 further comprising a retractor case, two openings in said retractor case for guidance of said seatbelts respectively and wherein the end portion of the pressure board in the shape of letter J is formed at a substantially right angle to the remainder of the letter J shaped pressure board.

10. A seatbelt winding device for motor vehicles comprising:
   a base;
   a shaft rotatably supported by said base, a pair of seatbelts wound upon said shaft one over the other, and a pressure board for preventing slack in said seatbelts, said pressure board having a letter J shaped portion resiliently engaging with the outside surface of one of said seatbelts wound up on said shaft whereby pressure is applied to said seatbelts toward the axis of said shaft, said letter J shaped portion having an end part formed at an approximate right angle to the remainder of the letter J shaped portion for guiding one of said seatbelts toward the extending direction of said one of said seatbelts.

* * * * *